(12) United States Patent
Robinson, III

(10) Patent No.: US 8,232,829 B2
(45) Date of Patent: Jul. 31, 2012

(54) ACTIVE RECTIFIER

(75) Inventor: Andrew Frederick Robinson, III, St. Helens, OR (US)

(73) Assignee: John Joseph Robinson, Scappoose, OR (US)

( * ) Notice: Subject to any disclaimer, the term of this patent is extended or adjusted under 35 U.S.C. 154(b) by 440 days.

(21) Appl. No.: 11/954,050

(22) Filed: Dec. 11, 2007

(65) Prior Publication Data

US 2009/0091379 A1   Apr. 9, 2009

Related U.S. Application Data

(60) Provisional application No. 60/869,350, filed on Dec. 11, 2006.

(51) Int. Cl.
*H03K 5/08* (2006.01)
(52) U.S. Cl. .......................... 327/330; 327/432
(58) Field of Classification Search .................. 327/330, 327/365, 376, 377, 387, 427, 432, 433; 363/126, 363/127
See application file for complete search history.

(56) References Cited

U.S. PATENT DOCUMENTS

| | | | | |
|---|---|---|---|---|
| 5,523,940 A * | 6/1996 | Wymelenberg | ............... | 363/127 |
| 5,929,690 A * | 7/1999 | Williams | ....................... | 327/374 |
| 6,212,084 B1 * | 4/2001 | Turner | .......................... | 363/127 |
| 6,421,262 B1 * | 7/2002 | Saxelby et al. | ............... | 363/127 |
| 6,469,564 B1 * | 10/2002 | Jansen | .......................... | 327/365 |
| 6,501,320 B1 * | 12/2002 | Le | .................. | 327/330 |
| 6,870,417 B2 * | 3/2005 | Mercier | ....................... | 327/493 |

* cited by examiner

*Primary Examiner* — Hai L Nguyen
(74) *Attorney, Agent, or Firm* — Foley & Lardner LLP

(57) ABSTRACT

In accordance with the present invention, the active rectifier is a circuit which directly takes the place of a passive rectifier by using a switching module (or simply a device in cases where a single device is used) controlled by a sensing circuit. Where passive devices have a single knee value determined by the physical properties of the semi-conductive material being used, the active circuit can be designed to a range of knee voltages and other performance criterion. Additional flexibility is available to the designer through the active rectifiers ability to allow for manipulation of the curve of response from the circuit in the knee region. Flexibility both in production, in designs, and in characteristics make the active rectifier highly valuable for engineering firms designing larger electronic circuits.

17 Claims, 5 Drawing Sheets

Active Rectifier Schematic

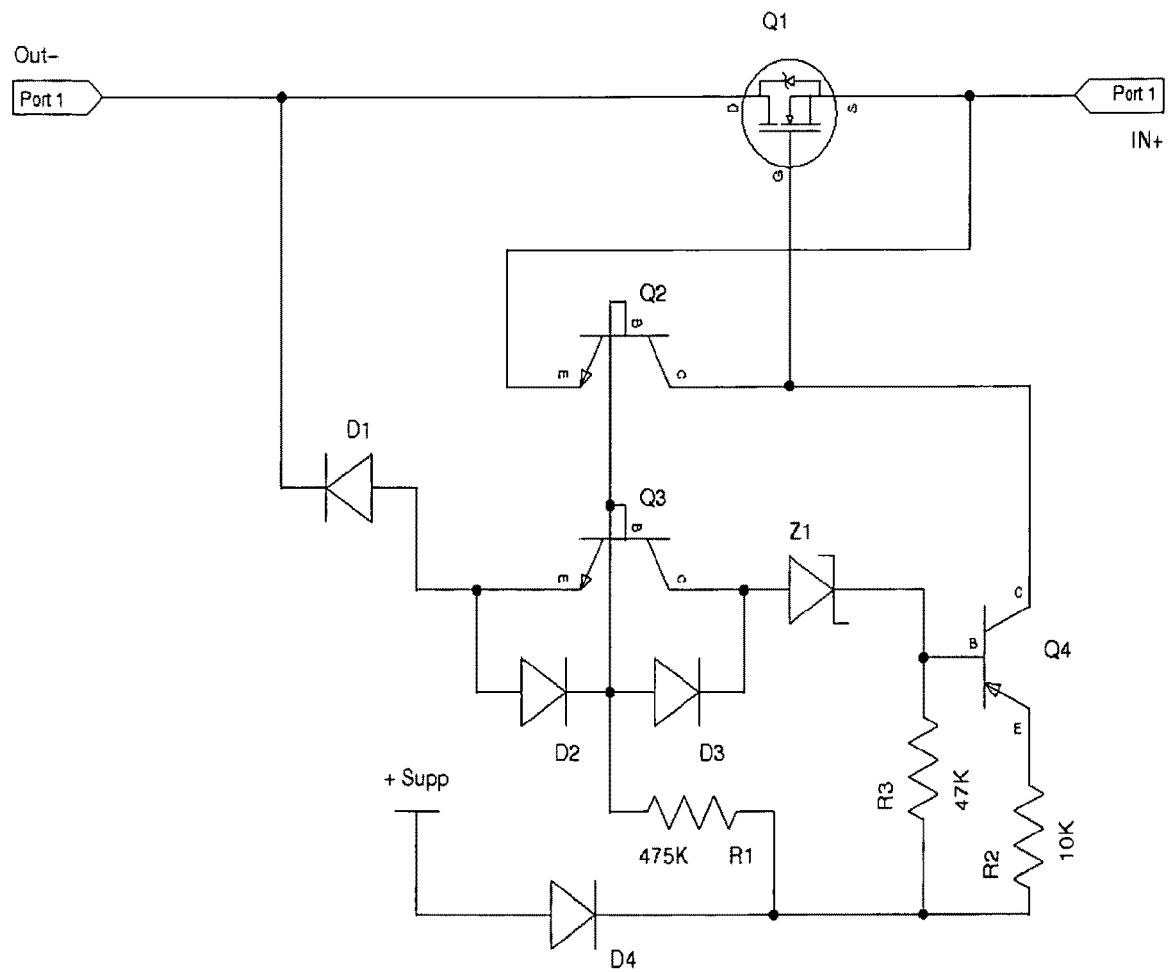
Figure 1: Active Rectifier Schematic

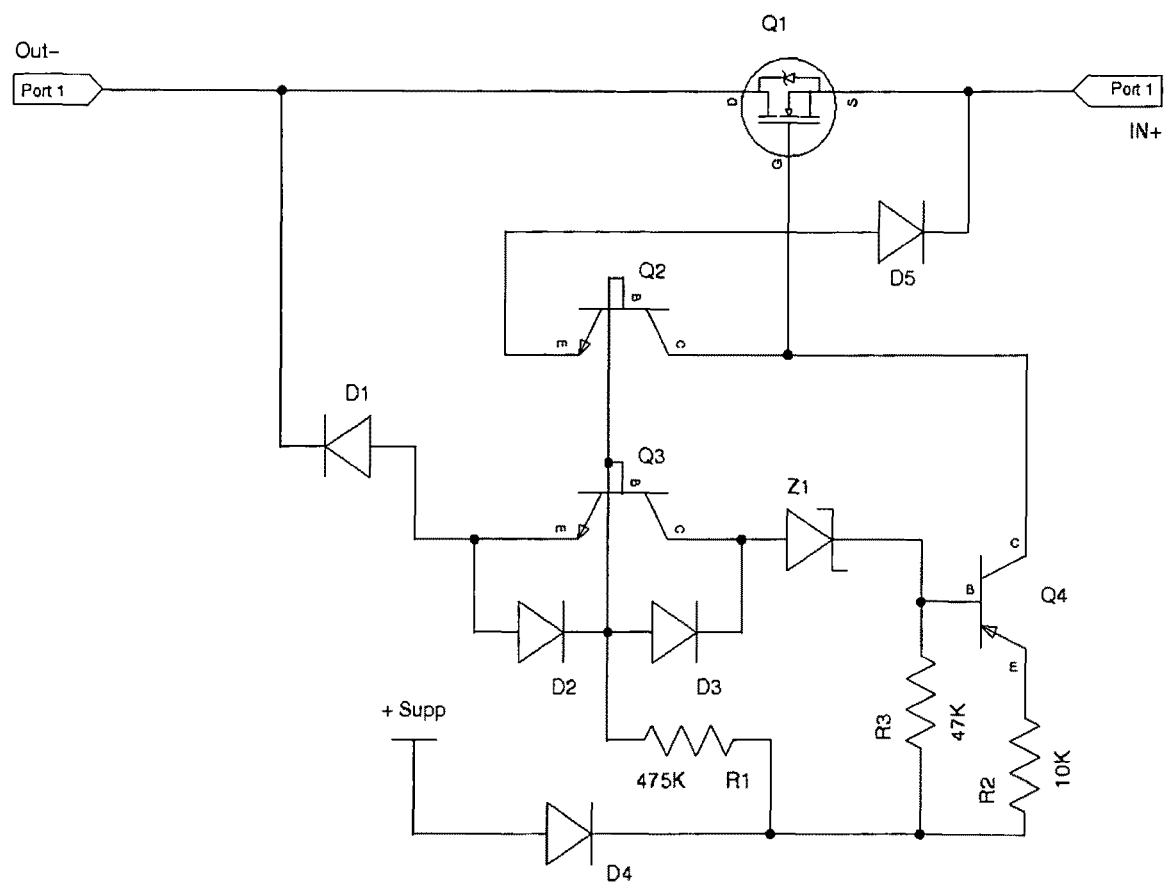
Figure 2: Alternate embodiment

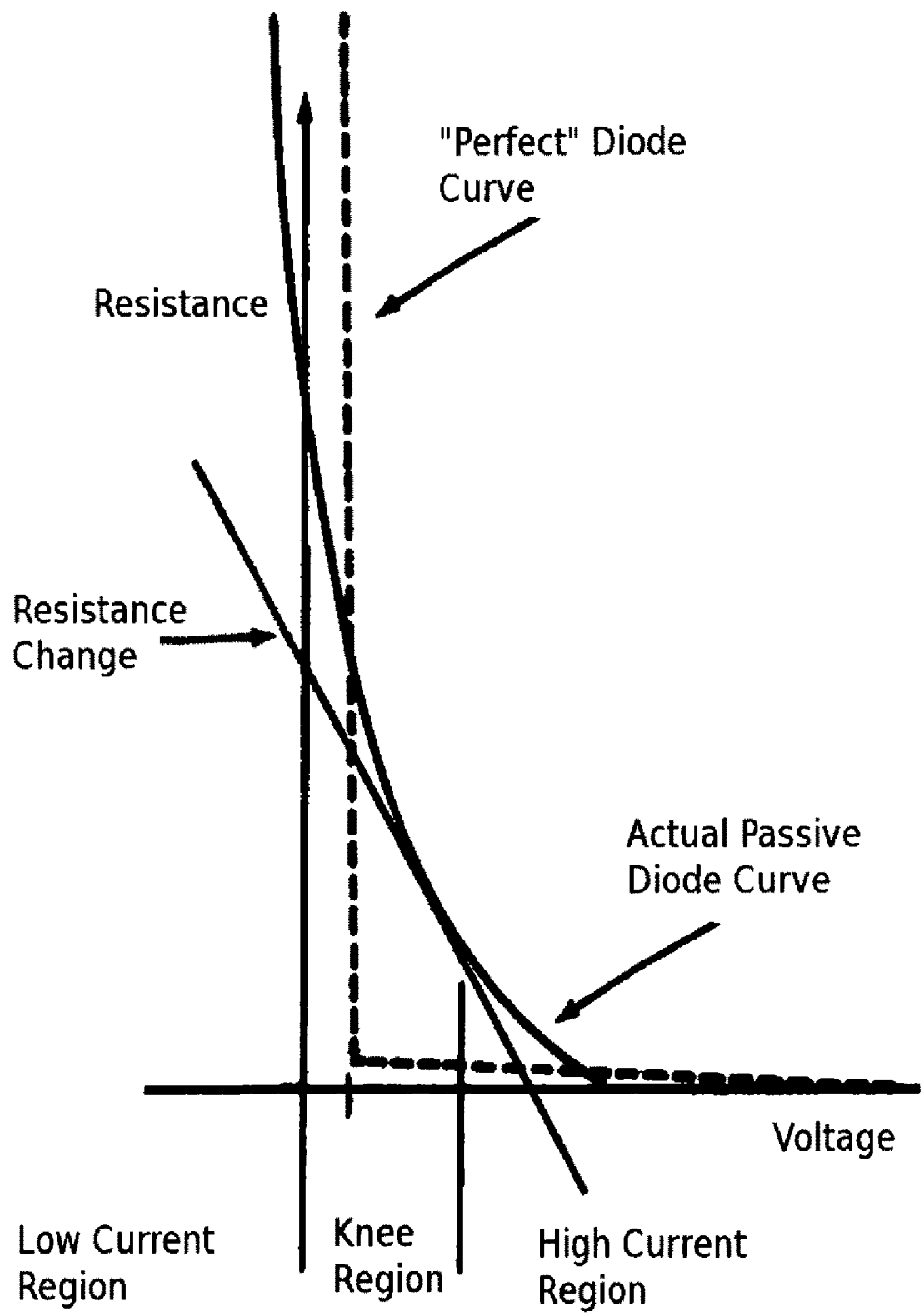
Figure 3: Prior Art, Concept of Perfect Diode

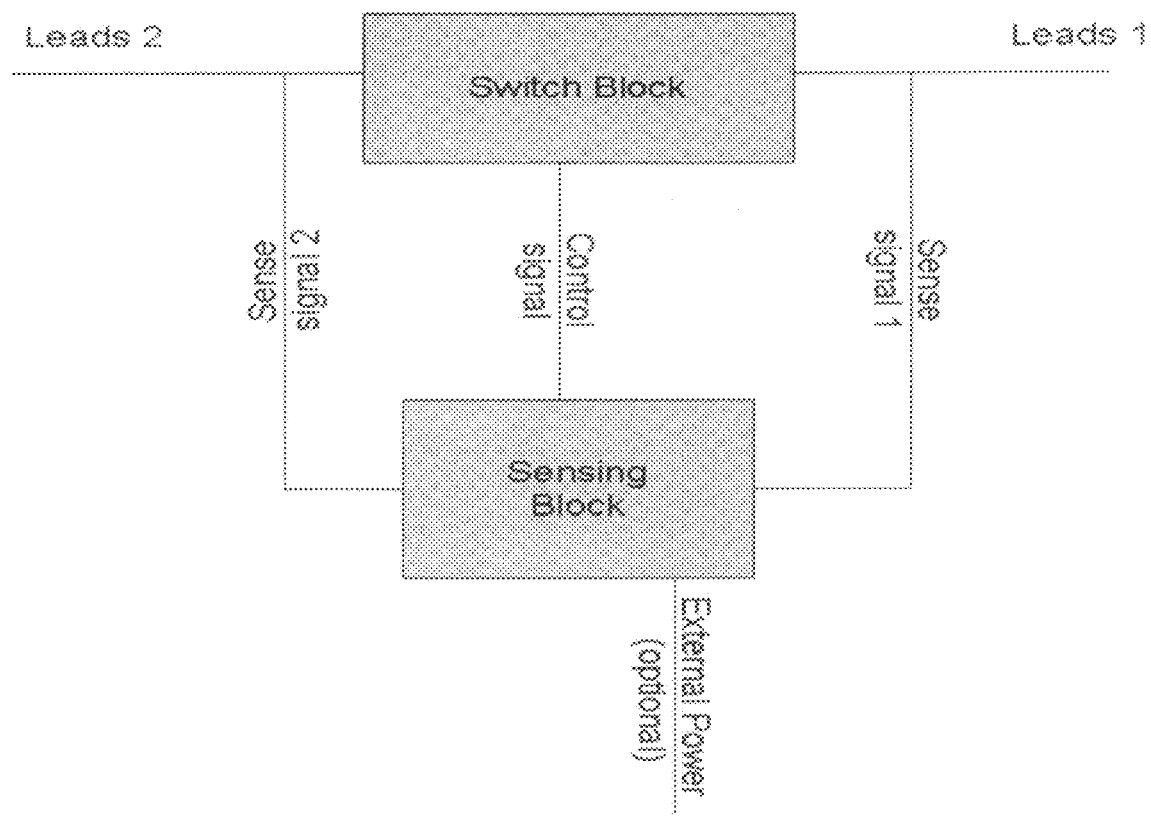
Figure 4: Functional Block Diagram of Active Rectifier

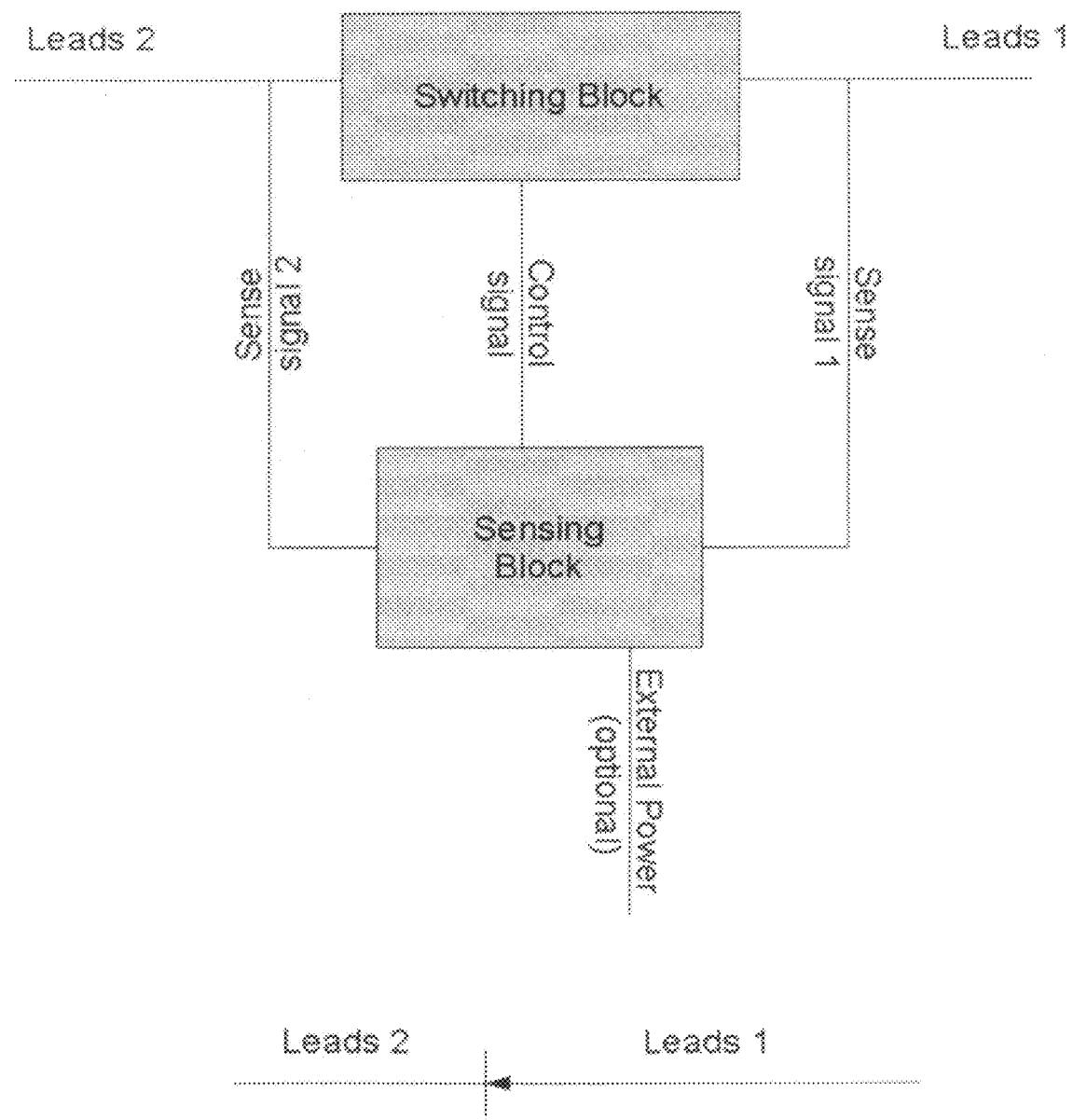
Figure 5: Comparison of passive and active rectifiers

ACTIVE RECTIFIER

CROSS-REFERENCE TO RELATED APPLICATIONS

This application claims the benefit of U.S. Provisional Application Ser. No. 60/869,350, filed Dec. 11, 2006, entitled "Active Rectifier" incorporated herein by reference in its entirety.

FEDERALLY FUNDED RESEARCH

Not Applicable

SEQUENCE LISTING OR PROGRAM

Not Applicable

BACKGROUND OF THE INVENTION

1. Field of Invention

This invention relates to the field of electrical engineering/electrical circuits. Specifically, this electrical circuit is intended to be used in larger circuits. Performance issues, cost issues, part availability issues, as well as other factors make this circuit expressly desirable as a replacement for passive rectifier alternatives in certain applications.

2. Prior Art

The first device used for rectification of current was the vacuum tube rectifier. This included a heated cathode, a heating wire, and an anode. The electrons on the cathode would gain sufficient energy from the heater that they would break free of the cathode and would head toward the anode. Electrons that collected at the anode, though, would not have sufficient energy to leave, and hence would be stuck at the anode. In this way, electrical current would flow in only one direction.

After the hollow state rectifier, the solid state p-n junction rectifier was used for controlling the direction of electricity in electrical circuits. FIG. 3 shows a graph of an actual p-n junction showing resistance vs. forward biased voltage on the junction. As the voltage increases, the resistance on the junction decreases. The two main features that are important on this diagram are the existence of a voltage where the device begins to turn on, called the knee voltage, and also the average slope of the tangent line to characteristic line within the knee region. The knee voltage in a semiconductor is intrinsic to the semi-conductive material being used while the shape of the knee region varies. Little adjustment is possible even at the silicon foundry. This is not a problem for power rectification of AC waves to DC voltage, for power regulation using non-precision voltage references like zener diodes, or for comparison of voltages where the signal is significant. When higher precision is necessary, having control of additional variables can make design of larger electrical circuits easier. Additionally, in instances where cheap, high current, low resistance active devices are available, it may be cheaper to use an active high power device rather than a high power passive rectifier. The flexibility to substitute a power circuit utilizing an active rectifier in place of a high power solid state rectifier allows additional flexibility by designers in what is becoming a highly competitive field. In the area of power rectification, the power component is by far the most expensive part, and its substitution has the greatest capability of decreased cost and increased profit. Even in low power applications, the additional flexibility allowed by changing the characteristic curves make this circuit valuable.

3. Objects and Advantages

This circuit takes the place of a passive rectifier in applications where:

a) A different knee voltage is desired from the knee voltages available from the different passive diodes, or b) A different slope on the knee is desired than available from commonly available diodes, or c) There is a need to dissipate lower total wattage than with a conventional passive rectifier.

For example, a FETs (Field Effect Transistor, a common switching device) typically generate substantially less heat and are more power efficient than their passive junction cousins. It is actually possible to use parts which cause this active rectifier to dissipate lower wattage overall than any diode commonly available.

d) Accomplishes rectification like a solid state rectifier utilizing a different power component allowing for additional flexibility in manufacturing power circuits based on economic conditions.

e) Additional variables including speed of switch, slope, thermal dissipation, etc. are required that would either be impossible to obtain using stock passive parts, or would cost more.

Of noticeable importance is that this invention is capable of having lower knee voltages than any power diode presently in production or having, conversely, higher knee voltages than any diode presently in production. Beyond these benefits, the active rectifier circuit can also dissipate lower wattage than the passive cousins which gives many reasons to spend the extra effort to build this active circuit with substantially more parts. Also note, however, that these are not the only advantages of this invention. This invention has at least two degrees of flexibility over the passive alternative. Hence, for any application where the passive solution doesn't quite meet the requirements, the active rectifier may.

Additionally, as mentioned above, being able to accomplish an old task in an alternative way opens new avenues depending on economics and part availability. In a condition where there is high demand for high power transistors, the price for parts may be sufficiently lower than traditional power rectifiers so that utilization of the active rectifier as a replacement may in the future prove useful to reduce price. If that is not the case, then other issues including availability, temperature ranges, integration, etc. could also prove an obstacle where a manufacturer may prefer to use this complex circuit over the conventional solid state high power PN junction.

SUMMARY

In accordance with the present invention, the active rectifier is a circuit which directly takes the place of a passive rectifier by using a switching module (or simply a device in cases where a single device is used) controlled by a sensing circuit. Where passive devices have a single knee value determined by the physical properties of the semi-conductive material being used, the active circuit can be designed to a range of knee voltages and other performance criterion. Additional flexibility is available to the designer through the active rectifiers ability to allow for manipulation of the curve of response from the circuit in the knee region. Flexibility both in production, in designs, and in characteristics make the active rectifier highly valuable for engineering firms designing larger electronic circuits.

BRIEF DESCRIPTION OF THE DRAWINGS

FIG. 1: Active Rectifier Schematic—This drawing uses standard electronics notation to depict a working embodiment of the invention. This schematic shows that there is an embodiment that is producible. Additional information on its operation can be found in OPERATION—FIG. 1.

FIG. 2: Alternate embodiment—This schematic adds diode D5. This diode causes the system to trigger differently and supports current suppositions in the claims. Additional information on its operation is found in operation of alternate embodiment.

FIG. 3: Prior Art, Concept of Perfect Diode—This drawing is of a graph of a typical passive diode curve with resistance as the y-axis and current as the x-axis. This is to help clarify the issue as there is a great deal of difference between the dotted line and the actual passive diode curve line.

FIG. 4: Functional Block Diagram of Active Rectifier— This Diagram breaks the invention into logical blocks so that the abstract idea can be clearly captured FIG. 5: Comparison of passive and active rectifiers—This diagram shows the standard symbol for a passive rectifier next to the block diagram of an active rectifier. It is to accentuate the differences in complexity and flexibility of the two options for rectification.

DETAILED DESCRIPTION

FIG. 1—Preferred Embodiment

A preferred embodiment of the present invention is illustrated in FIG. 1.

In the preferred embodiment, transistor Q1 is a field effect transistor with intrinsic reverse body diode, the intrinsic body diode is oriented in the same direction as the desired direction of rectification. Q2 and Q3 are NPN bipolar transistors, with bases connected together to form a differential pair. Although widely differing transistors can be used for Q2 and Q3, the preferred embodiment uses two transistors substantially the same. The diode D1 connects the emitter of Q3 to offset diode D1's anode. The cathode of D1 is attached to the drain side of FET, Q1. The emitter of Q2 is attached directly to the source of Q1. Thus the differential pair Q2,Q3 senses the difference in voltage across the FET Q1 with an additional voltage offset provided by D1.

In the preferred embodiment, An optional diode, D2, is connected from emitter to base of Q1, with the cathode of D2 attached to the base of Q3. Another optional diode, D3, is attached to Q3's base and collector with D3's anode connected to the Base, and D3's cathode attached to the collector.

Zener Z1's anode is connected to Q3's collector, and Z1's cathode is connected to the base of Q4.

The collector of Q4 is connected to the collector of Q2 and to the gate of transistor Q1.

The anode of diode D4 is connected to an external supply, +supp, of voltage with respect to at least one of Port1 in, and Port1 out. The cathode of D4 is connected to one terminal each of three resistors, R1, R2, and R3.

The remaining terminal of R1 is connected to the base of Q3. The remaining terminal of R3 is connected to the base of Q4. And the remaining terminal of R2 is connected to the emitter of Q4. The differential pair (Q2 and Q3), diode D1, zener diode Z1, transistor Q4 and resistors R2 and R3 form a difference amplifier. The operation of the difference amplifier is discussed further below.

Operation—FIG. 1

D4 serves to protect the diode circuit from application of reverse bias. The cathode side of protection diode D4 serves as the positive power supply of the preferred embodiment. Resistor R1 is a convenient source of current to bias at least one of Q2 and Q3 into forward active or saturated mode of operation.

Although differing transistors can be used to a similar effect, in the preferred embodiment an explicit diode, D1, is used insure that when Q1 has a voltage drop from source to drain substantially smaller than the voltage drop across diode D1, that Q3 will be biased into cutoff. Hence for current to flow through the collector of Q3, a necessary condition is that a small voltage drop exist from the source to the drain of Q1. This voltage would also naturally forward bias the internal body diode of Q1. Furthermore, since the emitters of a matched differential pair tend to be at zero potential with respect to each other—the voltage drop across D1 will necessarily be nearly the same as the voltage drop across from source to drain of Q1. This similarity will cause a similar/proportional current to flow through D1 as is flowing through the intrinsic body diode of Q1.

When Q3 is in cutoff, and therefore no substantial current is flowing through D1, no substantial current will flow through zener Z1. Q4's base-emitter voltage and current will therefore be determined solely by resistors R3 and R2. Thus, the absence of current in Z1 will cause the voltage drops across resistors R3 and R2 to be zero, and thus transistor Q4 will also be in cutoff.

When Q3 is in cutoff mode, only Q2 can be forward biased and therefore the voltage at the collector of Q2 with respect to its emitter will drop until Q2 saturates and the voltage from the gate to source of Q1 is drawn down to a voltage much lower than the threshold of Q1, and thus Q1 will be turned off.

However, when sufficient voltage is applied from source to drain of Q1, diode D1 will become forward biased. Under this condition, and provided that there is a voltage at the +supply sufficiently large to overcome the zener drop of Z1, current will flow through resistor R3. The voltage across R3 caused by this zener current will tend to forward bias the emitter base junction of Q4, and will also induce a voltage drop across resistor R2. The voltage across resistor R2 will cause a positive current to flow into the emitter of Q4. The majority of the current flowing into Q4's emitter will arrive at the collector of Q4.

Thus R3 and R2 and Q4 form a current mirror with gain determined by the values of these components. In the current mirror, the current through R3 is mirrored by the current through R2 and Q4.

And the positive current flowing out of Q4's collector will be in proportion to the current flowing in diode D1. Since the diode D1 tracks the intrinsic body diode of the FET, Q1, a forward bias across the source-drain terminals of Q1 will cause current to flow in Q4.

Since the voltage on the anode of D1 tracks the voltage at the source of FET Q1, when Q3 saturates in attempt to maintain the voltage at the anode of D1 because of a forward bias across the source drain terminals of Q1, the Zener diode's cathode will have a voltage approximately equal to the voltage rating of the diode above the voltage at the source. Since Q4 will saturate with a voltage on its collector that is a very small diode drop above the voltage at the zener's cathode— the voltage across the gate-source terminals of FET Q1 will be nearly the voltage of the Zener diode.

Thus in normal operation, the bias across the source and drain terminals of FET Q1 will cause the difference amplifier to produce a voltage across Q1's Gate-source terminals proportional to the said bias. (Q1 being the switch block of FIG. 4.)

This action amplifies the small bias across Q1's source and drain such that a small forward bias across the intrinsic body diode of Q1 will cause Q1 to be turned very solidly on. This action will cause the effective forward bias resistance of the body diode of Q1 to be reduced—and hence less power will be dissipated in the body diode. However, when the body diode of Q1 is reverse biased, the same amplification will cause Q1 to be turned off. The overall effect is to make Q1 act like a diode whose forward bias voltage drop is much less than that of it's intrinsic body diode—and whose characteristics can be controlled by selection of zener Z1 voltage, diode D1 voltage, and current mirror Q4-R2-R3's values.

Optional Diode D2 serves merely to prevent the leakage current of D1 when in reverse bias from inducing hot carriers in Q3—thus extending its lifespan. Optional diode D3 serves to reduce the saturation charge in Q3 allowing it to be reduced to cutoff faster, and hence to improve the reverse recovery of the FET Q1 when becoming reverse biased.

Operation of Additional Embodiments (FIG. 2)

The alternate embodiment of FIG. 2 has the same characteristics as that of FIG. 1, except that differential voltage across the source drain of transistor Q1 required to effectively produce current in D1 is reduced. Hence the circuit becomes more sensitive to the bias across the source drain terminals of Q1.

CONCLUSION, RAMIFICATIONS, AND SCOPE

This circuit would seem at first to not be something that is needed. However, having found applications which require reaction to voltage differentials a fraction of the knee voltage of silicon, there are presently no other alternatives. This circuit allows designers the opportunity to take more control of the response curves of their rectifier allowing them to utilize advantages of FET technology as well as other technologies.

The ramifications of this circuit are not limited to, but include sensing circuits, voltage references, as well as a host of other precision applications. The number of applications indeed are as varied as the applications for the original p-n junction. (FIG. 5 submitted for contrast)

Although the description above contains many specificities, these should not be construed as limiting the scope of the invention but as merely providing illustrations of some of the presently preferred embodiments of this invention. For example, the switching device can be a bipolar transistor driven by a set of Darlington transistors thus splitting the switching functions into two parts, or perhaps a driving circuit to drive a relay breaking the circuit by mechanical means, etc. In any case, the salient points are contained within the claims, and the claims and their legal equivalents ought to be used to determine the breadth of this filing as opposed to the preferred examples.

I claim:

1. An active rectifier comprising:
   a switching module including a switching transistor comprising an input, an output, and a gate; and
   a sensing module including:
      a first transistor electrically connected to the input;
      a second transistor electrically connected to the output;
      a current mirror, wherein the first transistor is electrically connected to a first side of the current mirror and the second transistor is electrically connected to a second side of the current mirror, wherein the current mirror is configured to drive the gate of the switching transistor, and a zener diode electrically connected between the second transistor and the current mirror.

2. The active rectifier of claim 1, wherein the current mirror is configured to drive the gate of the switching transistor such that when a voltage is applied across the input and the output, the current mirror applies a bias to the gate proportional to the voltage across the input and the output.

3. The active rectifier of claim 2, wherein the current mirror is configured to drive the gate of the switching transistor such that when the voltage across the input and the output is negatively biased, the current mirror biases the gate of the switching transistor such that the switching transistor will not conduct.

4. The active rectifier of claim 1, wherein the current mirror comprises a third transistor, a first resistor, and a second resistor, wherein the current mirror is configured such that a first current through the first resistor causes a second current through the third transistor and the second resistor, and the second current is proportional to the first current.

5. The active rectifier of claim 1, wherein the first transistor, the second transistor, and the current mirror form a difference amplifier.

6. The active rectifier of claim 1, further comprising a diode electrically connected between the second transistor and the output, wherein the diode is configured such that when a voltage smaller than a built-in voltage of the diode is applied across the input and the output, the second transistor is biased into cutoff.

7. The active rectifier of claim 6, further comprising a protective diode electrically connected across a body of the second transistor and an emitter of the second transistor, wherein the protective diode is configured to prevent a leakage current of the diode from reaching the second transistor.

8. The active rectifier of claim 1, further comprising a diode electrically connected between the first transistor and the input.

9. The active rectifier of claim 1, further comprising a cutoff diode electrically connected across a body of the second transistor and a collector of the second transistor, wherein the cutoff diode is configured to reduce a saturation charge in the second transistor.

10. The active rectifier of claim 1, wherein the first transistor and the second transistor form a matched pair of transistors.

11. The active rectifier of claim 1, wherein the switching transistor is a field effect transistor.

12. The active rectifier of claim 1, wherein the switching transistor is a bipolar transistor driven by Darlington transistors.

13. An active rectifier circuit comprising:
   a switching transistor comprising an input, an output, and a gate; and
   a differential amplifier including a current mirror,
   where the differential amplifier is configured to:
      detect a difference between a first voltage at the input and a second voltage at the output;
      amplify the difference; and
      drive the gate of the switching transistor using the amplified difference, wherein the current mirror is configured to drive the gate; and wherein the differential amplifier comprises a first transistor electrically connected to the input; a second transistor electrically connected to the output; and a zener diode electrically connected between the second transistor and the current mirror; wherein the first transistor is electrically connected to a first side of the current mirror and the second transistor is electrically connected to a second side of the current mirror.

14. The active rectifier circuit of claim 13, further comprising a diode electrically connected between the first transistor and the input.

15. The active rectifier circuit of claim 13, further comprising a diode electrically connected between the second transistor and the output, wherein the diode is configured such that when a voltage smaller than a built-in voltage of the diode is applied across the input and the output, the second transistor is biased into cutoff.

16. The active rectifier circuit of claim 13, wherein a base of the first transistor is electrically connected to a base of the second transistor.

17. A method of operating an active rectifier comprising:
  detecting a difference between a first voltage at an input of a switching transistor and a second voltage at the output of the switching transistor;
  amplifying the difference; and
  driving a gate of the switching transistor using the amplified difference;
  wherein a current mirror is configured to drive the gate;
  wherein said detecting difference comprises providing a first transistor electrically connected to the input; providing a second transistor electrically connected to the output; wherein a base of the first transistor is electrically connected to a base of the second transistor such that a current through the second transistor is proportional to the difference; and wherein said amplifying the difference comprises using the current mirror to amplify the current through the second transistor, and wherein the current mirror is separated from the second transistor by a zener diode.

* * * * *